United States Patent [19]

Tabacchi

[11] Patent Number: 4,818,093

[45] Date of Patent: Apr. 4, 1989

[54] HINGE FOR THE ELASTIC ARTICULATION OF A TEMPLE PIECE TO THE FRONT FRAME OF AN EYEGLASS FRAME

[76] Inventor: Vittorio Tabacchi, VII Strada 20, 35129 Padova, Italy

[21] Appl. No.: 97,745

[22] Filed: Sep. 17, 1987

[30] Foreign Application Priority Data

Sep. 23, 1986 [IT] Italy ................................ 23175-B/86.

[51] Int. Cl.$^4$ .......................... G02C 5/16; G02C 5/22
[52] U.S. Cl. .................................... 351/113; 351/153; 16/228
[58] Field of Search ....................... 351/113, 121, 153; 16/228

[56] References Cited

U.S. PATENT DOCUMENTS

| | | | |
|---|---|---|---|
| 3,837,735 | 9/1974 | Guillet | 351/113 |
| 4,456,346 | 6/1984 | Beyer | 351/113 X |
| 4,674,147 | 6/1987 | Arlik | 351/113 X |

*Primary Examiner*—Rodney B. Bovernick
*Attorney, Agent, or Firm*—Howard I. Schuldenfrei

[57] ABSTRACT

The present invention provides a hinge for the elastic articulation of a temple piece to the front frame of an eyeglass frame. The hinge includes a first hinge element fastened on the front frame and shaped externally in accordance with a cam profile, a second hinge element telescopically guided on a temple piece and urged by a spring into a retracted position within the temple piece, and a lug fastened on the temple piece and acting on the cam profile.

6 Claims, 2 Drawing Sheets

HINGE FOR THE ELASTIC ARTICULATION OF A TEMPLE PIECE TO THE FRONT FRAME OF AN EYEGLASS FRAME

BACKGROUND OF THE INVENTION

The object of the present invention is a hinge for the elastic articulation of a temple piece to the front frame of an eyeglass frame comprising a first hinge element fastened on the front frame and shaped externally in accordance with a cam profile, a second hinge element telescopically guided on the temple piece and urged by a spring into a retracted position within the temple piece, and a lug fastened on the temple piece and acting on the said cam profile.

The known hinges of this type offer the possibility of a preestablished stable positioning of the temple pieces in a folded position (for the putting away of the eyeglasses) or in an open position (for their use), and they furthermore make it possible to move the temple pieces elastically a short distance beyond the open position.

The reliability of these hinges, namely the ability to assure service which is constant in time, constitutes one of the main requirements expressed by the manufacturers of eyeglass frames.

Another fundamental requirement, which in a certain sense is contrary to the previous one, is the necessity of miniaturizing the hinge and its components as much as possible; by way of illustration, it may be stated that the aforementioned lug is generally not longer than 2 to 2.5 mm.

In accordance with the teaching of the prior art it has been customary up to now to fasten the lug to the temple piece by a screw which passes through it. The surface of the lug facing the cam profile has in such case the function of an abutment for the spring of the second hinge element.

This technical solution means that the lug must be made of very resistant material, such as, for instance, hardened steel.

However, if the lug is made of steel it is necessary to use a similar material also for the first hinge element, or at least for the surface thereof constituting the cam profile.

A teaching of this kind is, for instance, given in Italian Patent Application 22325-B/81 of the same applicant.

Among the main drawbacks of this technical solution the following may be pointed out:
 the difficulty in working the materials used, which gives rise, among other things, to a high cost of manufacture of the hinge,
 the difficulty in mounting the components of the hinge, in particular the lug,
 the possibility of the sticking of the hinge due to the rusting of its parts which are made of steel.

SUMMARY OF THE INVENTION

The purpose of the present invention is to provide a hinge the structure of which makes it possible to obviate all the drawbacks complained of with reference to the prior art mentioned.

The purpose is achieved by a hinge of the above-mentioned type which is characterized by the fact that it comprises an abutment for said spring which is formed on said temple piece and structurally independent of said lug, said lug being interposed between said abutment and said first hinge element.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

The characteristics and advantages of the invention will become more evident from the following detailed description of a preferred but not exclusive embodiment thereof, shown by way of example and not of limitation in the accompanying drawings, in which.

DETAILED DESCRIPTION OF THE INVENTION

Figure 1:
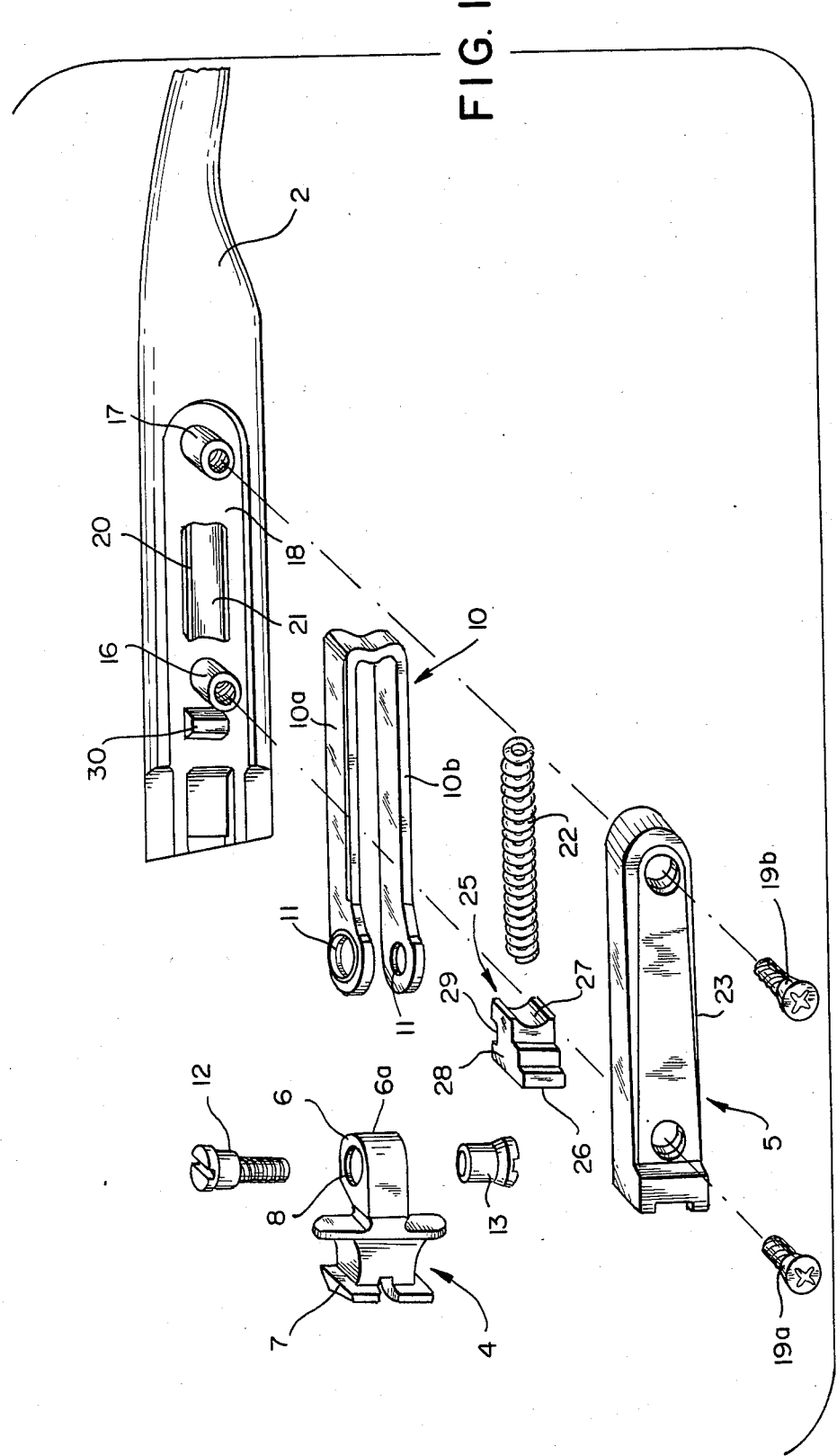
FIG. 1 is a perspective exploded view of the parts of the hinge of the invention.

In the figures, 1 generally indicates a hinge according to the invention for the elastic articulating of a temple price 2 to the front frame 3 of an eyeglass frame.

The hinge 1 comprises a first hinge element 4 and a second hinge element 5.

The first hinge element 4 consist of an eye 6 and a shank 7 for attachment to the front frame 3.

The eye 6 is shaped on its outside by two surfaces 6a, 6b joined at a right angle which constitute a cam profile. It is furthermore passed through by a continuous hole 8 of the axis of which is parallel to the surfaces 6a, b.

The second hinge element comprises a tie rod 10 cut from steel plate and bent into U-shape with two arms 10a, 10b. At each free end of the two arms 10a, b there is provided a flared hole 11. The rod 10 is attached to the eye 6 by screw 12 and lock nut 13, both with conical head, which pass through the holes 11 and 8 and constitute a hinge pin.

On a plate-shaped metal core 15 of the temple piece 2 there are provided, integral with it, a first bushing 16 and a second bushing 17, which extend at right angles from a surface 18 of said core 15.

When the hinge is assembled, the first bushing 16 is contained between the arms 10a, b of the tie rod 10.

In intermediate position between the bushings 16 and 17 on the core 15 there is formed a prominence 20 defining a cradle 21 for receiving a spring 22. The spring 22 extends between the bushing 16 which constitutes the abutment for it and the tie rod 10 so as to urge the said tie rod into a retracted position on the temple piece.

Both bushing 16 and bushing 17 are internally threaded for the engagement of respective screws 19a, 19b for the fastening of a cap 23.

A lug 25, preferably made of self-lubricating plastic, for instance of the type known commercially under the trademark "vespel" of the Dupont company, is placed between the eye 6 and the bushing 16. The lug 25 has a front surface 26 which cooperates with the cam profile formed by the surfaces 6a, 6b and is abutted, with form locking of its opposite surface 27, against the bushing 16.

Said lug 25 furthermore has two opposite side surfaces 28 against which the arms 10a, b of the tie rod 10 are slidably guided.

On the part facing the surface 18 of the core 15, the lug 25 is provided with a seat 29 for the retaining tooth 30 provided on the core 15. On the facing side, said lug has a step-shaped profile 29.

Figure 2:
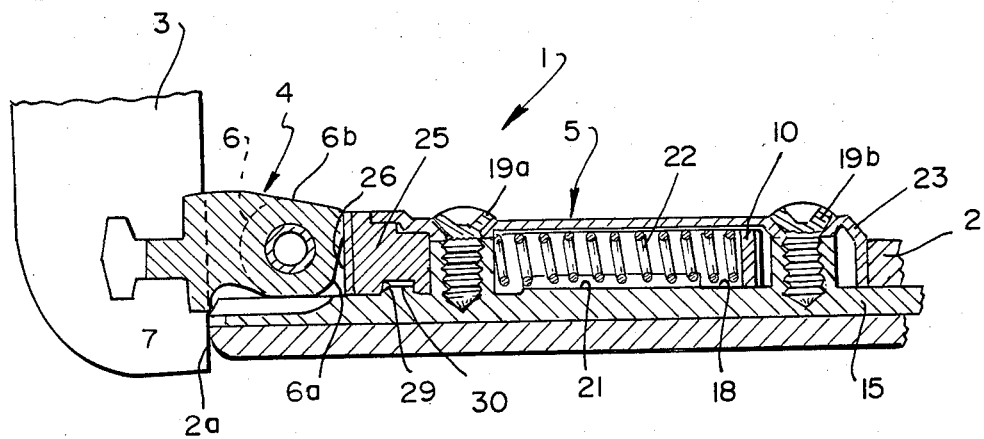
FIG. 2 is a top view in longitudinal section of a detail of an eyeglass frame provided with the hinge of the present invention.
Figure 3:
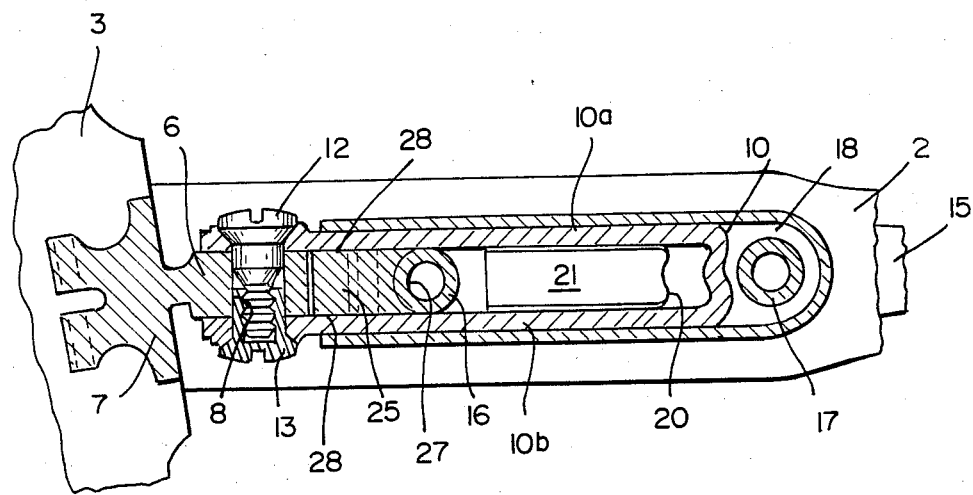
FIG. 3 is a side view in cross section through the detail shown in FIG. 2.

As shown in FIG. 2, the cap 23 acts, through the tightening of the screw 19, as clamp locking the lug 25 on the bar 2. The engagement of the tooth 29 [sic] in the seat 30 [sic] constitutes a means of preventing the loss of the lug 25.

When the bars 2 are in position folded back onto the front frame 3, the surface 26 of the lug 25 is placed, in a first position of equilibrium, against the surface 6b of the eye 6.

When the bars are moved apart to put on the eyeglasses, the lug 25 is caused to follow the cam profile of the surfaces 6a, 6b, causing the rod 2 to move away from the hinge axis (axis of the hole 8).

By means of the tie rod 10 the spring 22 is compressed slightly opposing such movement.

The connecting corner between the surfaces 6a and 6b having been passed, the elastic restoring action of the spring 22 on the tie rod 10 causes the urging of the bar 2 into a second position of equilibrium (open position) with the lug 25 pressed against the surface 6a of the eye 6.

In this condition, the free end 2a of the bar 2 which faces the front frame 3 is practically in contact with the latter. For this reason, in case of further urging of the bar 2 towards greater distance away, there is an elastic yielding of the hinge 1 with compression of the spring 22 by the tie rod 10.

In this movement of compression and extension, the spring 22 is guided by the cradle 21 defined on the projection 20. The edge of the projection 20 facing the bushing 17 constitutes also a mechanical stop for the tie rod 10 against excessive deviation of the bars 2.

The particular structure of the hinge of the present invention permits numerous advantages over the known hinges.

One of these advantages, relating to the production of the lug in a manner independent of the abutment of the spring is that it is possible to make the lug of plastic material. This furthermore makes it possible to use softer materials, such as for instance German silver, for the first hinge element since the mechanical wear to which such materials would be subjected in the case of sliding contact against hard materials (traditional lug of steel) is practically zero in the case of sliding contact with plastic materials.

Furthermore, the development and mounting of this new hinge are greatly simplified as compared with the traditional hinges.

It will thus be seen that the objects set forth above, among those made apparent from the preceding description, are efficiently attained and, since certain changes may be made in the above constructions without department from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A hinge for the elastic articulating of a temple piece to the front frame of an eyeglass frame, comprising a first hinge element fastened on the front frame and shaped externally in accordance with a cam profile, a second hinge element telescopically guided on the temple piece and urged by a spring into a retracted position within the temple piece and a lug fastened on the temple piece and acting on said cam profile, characterized by the improvement (fact) that it includes a resilient abutment for said spring formed in said temple piece, which is structurally independent of said lug, said lug being interposed between said abutment and said first hinge element.

2. A hinge according to claim 1, characterized by the fact that the lug is abutted against said abutment on the side facing said spring.

3. A hinge according to claim 1, characterized by the fact that the abutment is formed of a threaded bushing provided for the fastening of a cap which protects the second hinge element.

4. A hinge according to claim 3, characterized by the fact that said bushing is made integral with a metal core of said temple piece.

5. A hinge according to claim 3, characterized by the fact that the lug is made of plastic material.

6. A hinge according to claim 4, characterized by the fact that on said metal core there is formed a projection defining a cradle for the receiving the guiding of said spring as well as a mechanical stop for said second hinge element.

* * * * *